Aug. 11, 1942. L. F. THIRY 2,292,676
RUBBER BALL AND SOCKET JOINT
Filed Aug. 21, 1941
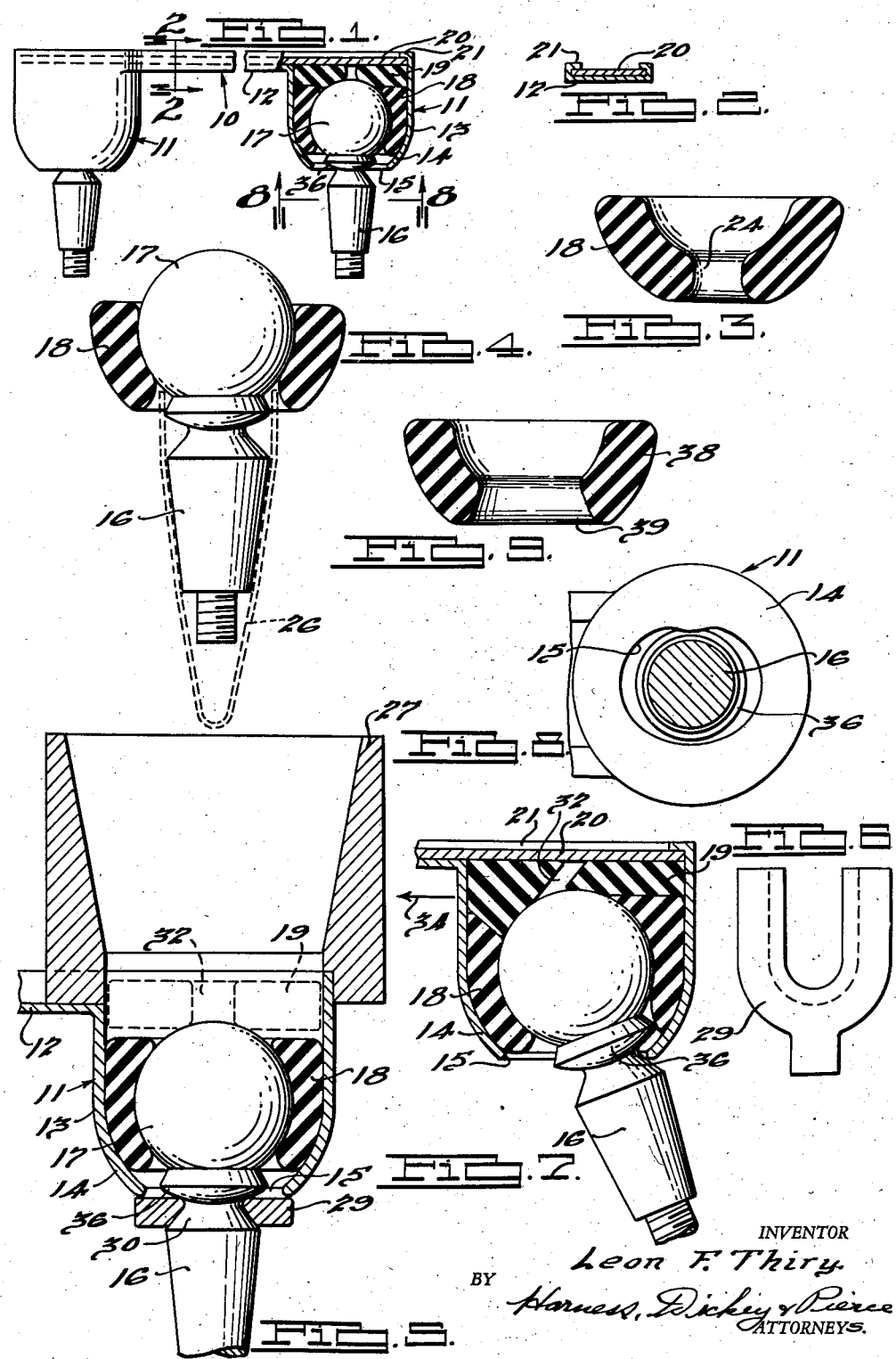
INVENTOR
Leon F. Thiry
BY
Harness, Dickey & Pierce
ATTORNEYS.

Patented Aug. 11, 1942

2,292,676

UNITED STATES PATENT OFFICE 2,292,676

RUBBER BALL AND SOCKET JOINT

Leon F. Thiry, Montclair, N. J.

Application August 21, 1941, Serial No. 407,701

7 Claims. (Cl. 287—85)

The present invention relates to a ball and socket joint and method of making the same, and is an improvement on the invention disclosed in applicant's copending application, Serial No. 383,699, filed March 17, 1941.

The aforementioned application discloses a ball and socket joint of the type in which the ball and socket are assembled with an intermediate layer of distortable rubber which is in a substantially deformed condition, the relative movements of the ball and socket being accompanied by a distortion of the rubber without any slippage between the rubber and either the ball or the socket. Likewise, in the construction of the prior application, the rubber in the vicinity of the window in the socket, through which the ball stem projects, is under greater deformation than the remainder of the rubber in order to resist movement of the ball head out of the socket. This deformed condition of the rubber in the vicinity of the socket window is achieved by placing the rubber under compression and causing it to elongate from the free end of the ball toward the stem thereof during the assembly of the joint.

For some purposes, where a severe force is exerted upon the ball, tending to pull it out of the socket, the condition of the highly deformed rubber in the vicinity of the socket window is a matter of great importance, and it has been found that certain benefits result from an assembly operation which causes the rubber to elongate from the highly compressed region adjacent the socket window toward the back, or bottom, end of the socket, and, accordingly, it is one object of the present invention to provide a joint and method of assembling the same which will result in that mode of deformation, as distinguished from that which occurs in the assembly of the joint disclosed in said prior application.

Another object of the invention is to provide a ball and socket joint of the type mentioned in which the rubber insert is so shaped that it will positively control its own location in the assembled joint.

Another object of the invention is to provide means in a ball and socket joint of the type mentioned to limit distortion of the rubber in the vicinity of the socket window under severe stress, and thus avoid undesired slippage between the rubber insert and the ball or socket.

Other objects and advantages of the invention will become apparent from the following specification, the accompanying drawing, and the appended claims.

In Figure 1 of the drawing is shown a side elevation, partly in section, of a link mechanism embodying two ball and socket joints constructed in accordance with the present invention;

Fig. 2 is a section taken on the line 2—2 of Fig. 1, showing the construction of the link;

Fig. 3 is a sectional view, showing the free state of the preferred form of molded rubber insert;

Fig. 4 is a view showing the manner in which the insert of Fig. 3 is assembled upon the ball element of the joint;

Fig. 5 is a view illustrating the manner in which the ball element and rubber insert are assembled in the socket element of the joint;

Fig. 6 illustrates the retaining fork used to retain the ball and rubber socket in assembled position during the closure of the open, or back, end of the socket;

Fig. 7 is a view showing the action of the improved ball and socket of the present invention under load;

Fig. 8 is a section taken on the line 8—8 of Fig. 1, showing the formation of the bottom of the socket; and Fig. 9 is a cross section of an alternative form of molded rubber insert in its free state.

Referring to the drawing, and particularly to Fig. 1, it will be seen that the ball of the socket joint, for purposes of illustration, is shown as part of a link indicated generally at 10, having similar ball and socket joints indicated generally at 11 at each end. The particular form of link illustrated is adapted for use in connecting a rotary vane type shock absorber arm to the frame or axle of a motor vehicle, but it will be appreciated that the ball and socket joint may be utilized for other purposes.

The link 10 is formed of a primary piece of sheet metal 12 in the form of a strip in the ends of which cup-shaped sockets 13 are formed by a stamping operation. The cup-shaped sockets 13 have semi-spherical bottom portion walls 14 provided with a central opening or window 15, through which the stem 16 of a ball element 17 is adapted to project when the joint is assembled. An annular molded rubber insert 18 surrounds the ball within the socket and is in a condition of substantial deformation, as hereinafter described. A separate rubber pad 19, likewise deformed from its free shape, is seated against the upper, or free, end of the ball 17 and the upper edge of the insert 18, and is held in position by a closure plate 20.

In the link arrangement illustrated, the closure 20 extends the full length of the link 10 and is held in position by flanging over the entire peripheral edge 21 of the link element 12.

The free state of the preferred form of molded rubber insert 18 is illustrated in Fig. 3, and it will be noted that it is substantially semi-spherical in form and is provided with a bottom opening 24 of a smaller diameter than the diameter of the ball stem 16. It will be noted, further, that the thickness of the rubber insert 18 in its free state is substantially greater than its thickness in the assembled joint, as illustrated in Figs. 5 and 7.

The rubber insert 18 is first assembled on the ball element 17, preferably by placing a conical sheet metal pilot 26, shown in dotted lines in Figure 4, over the stem of the ball element and forcing the stem with its pilot 26 through opening 24 of the insert 18 until the insert is located in the position illustrated in Fig. 4. It will be noted that as a result of this initial assembly operation, the material of the rubber insert 18 adjacent the stem 16 of the ball 17 has been materially stretched circumferentially of the ball and stem element. As a result, the insert tightly grips the ball in the area adjacent the ball stem and, because of its tension, as well as the fact that the opening is smaller than the diameter of the ball, resists further sliding movement of the rubber insert 18 on the ball 17 toward the free end thereof either during the subsequent assembly operations or when the finally assembled joint is in operation.

After the parts are assembled in the position shown in Fig. 4, the pilot 26 is removed and the assembled ball and insert 18 are inserted within the socket 11 by forcing them through a frusto-conical or funnel-shaped guiding element 27, illustrated in Fig. 5. The guiding element 27 flares outwardly from an opening of the same diameter as the socket 13, and is designed to fit against the upper end of the socket. The ball 17 and assembled insert 18 may be either pushed into or pulled through the guide 27 and into the socket 13 until the parts are substantially in the position illustrated in Fig. 5. In this position, the center of the ball may coincide with the center of the semi-spherical wall 14 of the socket, but preferably at this stage, for reasons hereinafter stated, the ball is pushed downwardly beyond that point to a slight extent. In either event, when the ball and insert 18 are so positioned, they are temporarily held in that assembled position in any suitable manner, as by the use of a fork element 29, shown best in Fig. 6, which is slid into a position embracing the stem 16 of the ball and which is adapted to engage the bottom end of the socket 13 and a shoulder 30 on the stem to prevent movement of the ball toward the upper end of the socket.

It will be noted that during the assembly operation just described, the rubber insert 18 is substantially reduced in thickness and caused to flow axially of the ball and stem toward the upper free end of the ball. This flow, or elongation, of the rubber is substantially all in an upward direction, as viewed in Fig. 5, as it will be noted that the lower end of the insert in Fig. 5 is in substantially the same position relative to the ball 17 as it was in Fig. 4. This is of advantage in that it results in a better condition of tension, or deformation, in the rubber insert adjacent the window 15 in the socket 13 than would be the case if the flow of the rubber had been in the opposite direction. It will be noted, further, that the portion of the rubber insert adjacent the stem end of the ball is under a greater degree of distortion than that portion of the insert above the center of the ball, as viewed in Fig. 5, as a result of the fact that the socket 13 above the center of the ball is cylindrical in form. It is exceedingly important that the portion of the rubber insert in contact with the semi-spherical wall 14 of the socket be under a greater tension than the rubber in contact with the free end of the ball to resist movement of the ball toward the window 15 and to compensate for the smaller area of rubber in contact with the stem end of the ball, as compared with that in contact with the free end in the finally assembled joint.

After the ball and rubber insert are placed in the position shown in Fig. 5 and retained in that position by the fork 29, the rubber pad 19 is inserted in the upper open end of the cup-shaped socket, and the closure plate 20 is forced into position and held in finally assembled position until permanently secured thereby flanging over the edge 21 of the link element 12.

It is desired that the pad 19 have in its free state a cross-sectional area less than the area of the open upper end of the socket 13 and also have an initial thickness such that upon assembly of the closure plate 20, the pad 19 will be deformed by substantially reducing its thickness and increasing its cross-sectional area. The reduced cross-sectional area of the pad 19 may be secured either by providing a central opening 32 in the pad, as illustrated in the drawing, or by making the pad of smaller external diameter than the diameter of the open upper end of the cup-shaped socket. In either event, the pad may be substantially deformed upon assembly of the joint, and its tendency to return to its free state exerts a yielding pressure on the ball and the upper edge of the insert 18.

Where the pad is made of substantially the same external diameter as the open upper end of the cup and is provided with the central opening 32, both its thickness and the diameter of the opening 32 will be greater when the pad is in its free state, illustrated in dotted lines in Fig. 5, than after the closure plate 20 is assembled in final position.

After the pad 19 and cover plate 20 are assembled, the temporary retaining fork 29 may be removed.

Assembly of the pad 19 and cover plate 20 may be facilitated if, as previously mentioned, the center of the ball 17 is temporarily pushed toward the opening 15 in the socket 13 beyond the center of the semi-spherical socket wall 14, and is held in this temporary position by means of the fork 29. If this practice is followed, then, upon subsequent removal of the retaining fork 29, the center of the ball will return to a position substantially coinciding with the center of the semi-spherical wall 14 and increase the compression and deformation of the assembled pad 19.

It will be understood that the particular arrangement of the link 10 need not be employed in connection with the ball and socket joint herein described, but that the socket 13 may be formed in any desired manner of any desired material. Likewise, the upper open end of the socket 13 need not be closed by a closure plate 20 of the type described, but may be closed by any ordinary or desired mechanical means without affecting the performance of the joint itself.

The completely assembled joint will permit substantial universal movement of the ball and stem relative to the axis of the socket, and will sustain substantial loads without any slippage between the rubber insert and either the ball or the socket. In this connection, it will be noted that the rubber insert adjacent the ball stem is under substantial circumferential tension due to the enlargement of the opening 24 in the insert. This causes the insert to exert an increased gripping force upon the ball to thereby compensate for the smaller area of contact with the ball as compared with the area of the contact of the semi-spherical wall 14.

When the joint is subject to a load at right angles to the axis of the stem 16, the rubber insert at one side tends to reduce in thickness and the material of the insert increases in thickness at the opposite side. A substantial change in thickness of the insert may be caused in this manner without any slippage between the surface of the insert and either the ball or the socket. However, it is found that in some cases where an exceedingly severe shock or overload is applied in the direction of the arrow 34 in Fig. 7, and particularly when the ball stem is at an angle to the axis of the socket, as illustrated in that figure, the compression upon the rubber insert 18 may be sufficient to cause a slippage between the insert and the ball and socket elements and a consequent permanent displacement of the center of the ball from its normal position. This condition may, if the opening 15 is sufficiently large, permit the ball 17 to be pulled entirely out of the socket, but, in any event, it interferes with the free oscillating movement of the ball stem relative to the socket because it permanently shifts the normal axis of the stem 16 away from the center of the socket opening 15.

To overcome this difficulty, there is provided, in accordance with the present invention, an enlarged annular projecting shoulder 36 on the ball around the base of the ball stem, which shoulder projects radially from the surface of the ball by an amount which is preferably slightly more than one-half the difference in radius of the ball and the inside of the semi-spherical wall 14 of the socket, and is adapted to limit displacement of the center of the ball from the center of the semi-spherical wall 14 to the maximum amount of displacement which can occur without causing slippage and permanent displacement of the insert with respect to either the ball or the socket.

The window 15 of the socket 13 may be of any desired shape, depending upon the movement which the ball and stem are to have with respect to the socket axis in the particular application under consideration. It is desirable to make the opening as small as possible and, therefore, the periphery of the opening is preferably shaped to almost contact the ball stem in its extreme angular position in every direction. As a result, the opening 15 may in some cases be irregular in shape, as illustrated in Fig. 8.

It is possible, with the type of ball and socket joint disclosed in the present application, to have the opening 15 sufficiently small to prevent the shoulder 36 from passing through the opening in any position of the ball stem 16. In the usual case, however, a shoulder 36 will be sufficiently small in diameter to pass through the opening. This does not impair its utility where the only condition under which a pulling force exerted on the link has any tendency to withdraw the ball from the socket is when the axis of the stem 16 is at an angle to the axis of the socket, as illustrated in Fig. 7. In this relative position of the parts, the shoulder 36 will be telescoped within the semi-spherical wall 14 and in a position to engage directly the wall 14 to limit compression of the rubber insert at the right-hand side, as viewed in Fig. 7, and to limit movement of the ball out of the socket, even though the window is larger than the diameter of the shoulder and the ball.

It will be apparent that the provision of a shoulder such as the shoulder 36 to directly engage the semi-spherical wall of the socket is not limited in its application to the specific form of ball and socket joint disclosed in the present application, but is equally applicable to other forms including the type of ball and socket joint disclosed in applicant's aforementioned copending application, Serial No. 383,699.

In some cases, it may be found unnecessary to provide a rubber insert formed, as shown in Fig. 3, with an exceedingly small opening at one end. In such cases, the opening may be made larger up to the size in the modified form of insert 38 shown in Fig. 9. The insert 38, illustrated in Fig. 9, is generally similar to the insert 18, shown in Fig. 3, except that the small opening 39 in the center of the insert 38 is approximately equal to the diameter which the insert will have in its finally assembled form. This modified form of insert is of advantage in that it is easier to assemble than the preferred form since it may be simply inserted over the ball stem 16 without the use of the pilot 26. The fact that the opening 39 is substantially smaller than the enlarged open end of the insert 38 prevents the insert from slipping materially in an axial direction on the ball surface surface during the assembly of the ball insert in the socket, and, therefore, assists in automatically locating the insert in its proper position in the assembled joint. Except for the fact that it is not tensioned circumferentially of the ball and stem, the insert 38 is similar in operation and construction to the insert 18 shown in Fig. 3.

The rubber insert in both forms and the pad are preferably made from rubber of 60–65 durometer but they may range in hardness from 50 to 70 durometer. The degree of distortion of the rubber insert in contact with the semi-spherical wall 14 may also be varied but preferably involves a substantial reduction in thickness of the rubber insert in order to avoid slippage between the rubber and either the ball or socket. The pad 19, while similiarly deformed, is deformed to a lesser degree than that portion of the insert in contact with the semi-spherical wall in order to compensate for the larger area of contact at the free end of the ball.

Joints made in accordance with the present invention are able to withstand substantial loads and a substantial angular movement of the ball with reference to the socket without any friction or slippage whatsoever between the rubber and the metal parts. In addition, they can withstand substantial overloads without having the ball pulled from the socket or without permanently displacing the center of the ball with respect to the center of the socket.

In the preferred constructions illustrated and described, the ball and bottom wall of the socket are spherical in form, but it will be understood While only two modifications of the invention are illustrated and described, it will be apparent that others are available within the spirit of the invention as described herein and within the scope of the appended claims.

What is claimed is:

1. A ball and socket joint formed of a cup-shaped socket having a bottom wall provided with an opening therethrough, a ball positioned within said socket in spaced relation to said wall thereof and having a stem projecting through said socket opening, and an annular rubber element surrounding the ball and located in the space between the ball and said wall of the socket, said rubber element being in its free state of substantially greater thickness than said space between the ball and socket and having an opening therethrough which in the free state of said element is substantially smaller at the stem end of the ball than at the opposite end and substantially smaller at said smaller end than the diameter of the ball itself, whereby on assembly that portion of the rubber element in contact with the stem end of the ball is substantially reduced in thickness and elongated axially with respect to the stem axis toward the free end of the ball.

2. A ball and socket joint formed of a cup-shaped socket having an internally concave bottom wall provided with an opening therethrough, a ball positioned within said socket in spaced relation to said wall thereof and having a stem projecting through said socket opening, and an annular rubber element surrounding the ball and located in the space between the ball and said wall of the socket, said rubber element being in its free state of substantially greater thickness than said space between the ball and socket and having an opening therethrough which in the free state of said element is substantially smaller at the stem end of the ball than at the opposite end and substantially smaller at said smaller end than the diameter of the ball stem, whereby on assembly that portion of the rubber element in contact with the stem end of the ball is substantially reduced in thickness and elongated both axially toward the free end of the ball and circumferentially with respect to the stem axis.

3. A ball and socket joint formed of a cup-shaped socket having a bottom wall provided with an opening therethrough, a ball positioned within said socket in spaced relation to said wall thereof and having a stem projecting through said socket opening, and an annular rubber element surrounding the ball and located in the space between the ball and said wall of the socket, said rubber element being in its free state of substantially greater thickness than said space between the ball and socket and having an opening therethrough which in the free state of said element is substantially smaller at the stem end of the ball than at the opposite end and substantially smaller at said smaller end than the diameter of the ball itself, whereby on assembly that portion of the rubber element in contact with the stem end of the ball is substantially reduced in thickness and elongated axially with respect to the stem axis toward the free end of the ball, and a closure for the upper end of the cup-shaped socket adapted to retain the ball in a position in which it maintains said portion of the rubber element in said condition of reduced thickness.

4. A ball and socket joint formed of a cup-shaped socket having an approximately semi-spherical bottom wall provided with an opening therethrough, a ball positioned within said socket in spaced relation to said wall thereof and having a stem projecting through said socket opening, and an annular rubber element surrounding the ball and located in the space between the ball and said wall of the socket, said rubber element being in its free state of substantially greater thickness than said space between the ball and socket and having an opening therethrough which in the free state of said element is substantially smaller at the stem end of the ball than at the opposite end and substantially smaller at said smaller end than the diameter of the ball itself, whereby on assembly that portion of the rubber element in contact with the stem end of the ball is substantially reduced in thickness and elongated axially with respect to the stem axis toward the free end of the ball, and a closure for the upper end of the cup-shaped socket adapted to retain the centers of the ball and said semi-spherical wall in approximate coincidence, said closure including a compressed rubber pad engaging the exposed end of the ball and the end of said rubber element.

5. A ball and socket joint formed of a cup-shaped socket having an approximately semi-spherical bottom wall provided with an opening therethrough, a ball positioned within said socket in spaced relation to said wall thereof and having a stem projecting through said socket opening, and an annular rubber element surrounding the ball and located in the space between the ball and said wall of the socket, said rubber element being in its free state of substantially greater thickness than said space between the ball and socket and having an opening therethrough which in the free state of said element is substantially smaller at the stem end of the ball than at the opposite end and substantially smaller at said smaller end than the diameter of the ball itself, whereby on assembly that portion of the rubber element in contact with the stem end of the ball is substantially reduced in thickness and elongated axially with respect to the stem axis toward the free end of the ball, and a closure for the upper end of the cup-shaped socket adapted to retain the centers of the ball and said semi-spherical wall in approximate coincidence, said closure including a rubber pad which is initially of smaller area than the area of the open end of the cup-shaped socket but which in the assembled joint is substantially reduced in thickness and increased in area to place the rubber in a state of tension.

6. A ball and socket joint comprising a socket element having a wall portion in the form of a portion of a sphere and provided with an opening therethrough, a ball element positioned within said socket in spaced relation to said wall and with its center in approximate coincidence with the center of said wall portion and having a stem projecting through said opening, and a mass of rubber between the ball element and said wall portion and under compression in the assembled joint, said ball element having an annular shoulder projecting therefrom around the base of the stem and within said socket and adapted to engage the inner side of said wall portion in the vicinity of said opening when the center of the ball is displaced toward said opening by an abnormal force to limit distortion of the rubber in contact with said wall portion.

7. A ball and socket joint comprising a socket element having a wall with an inturned portion defining an opening, a ball element positioned within said socket in spaced relation to said wall and having a stem projecting through said opening, a mass of rubber between the ball element and said wall portion and under compression in the assembled joint, one of said elements having an annular projection in the vicinity of said opening adapted to engage the other element directly when the center of the ball is displaced toward said opening by an abnormal force and limit distortion of said rubber mass.

LEON F. THIRY.